(12) United States Patent
Karas et al.

(10) Patent No.: US 9,597,943 B2
(45) Date of Patent: Mar. 21, 2017

(54) SWING ARC HVAC DUCT

(71) Applicant: Ford Global Technologies, LLC, Dearborn, MI (US)

(72) Inventors: Lawrence C. Karas, New Boston, MI (US); Mukesh Kumar, Canton, MI (US); Eric R. Yerke, Redford, MI (US); Robert Steven Sawyer, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 269 days.

(21) Appl. No.: 14/469,725

(22) Filed: Aug. 27, 2014

(65) Prior Publication Data

US 2016/0059667 A1    Mar. 3, 2016

(51) Int. Cl.
*F16L 25/00* (2006.01)
*B60H 1/00* (2006.01)
*F16L 37/26* (2006.01)

(52) U.S. Cl.
CPC ..... *B60H 1/00564* (2013.01); *B60H 1/00528* (2013.01); *F16L 37/26* (2013.01)

(58) Field of Classification Search
USPC ......... 285/325, 67, 103, 326, 327, 405, 328; 454/136, 137
See application file for complete search history.

(56) References Cited

U.S. PATENT DOCUMENTS

2005/0202774 A1    9/2005  Lipke
2013/0175796 A1*   7/2013  Ranta ................... F16L 37/086
                                                        285/81
2014/0073232 A1    3/2014  Karas et al.

FOREIGN PATENT DOCUMENTS

CN    201502702 U     6/2010
KR    1020050076500 A  7/2005
KR    1020070056666 A  6/2007

* cited by examiner

*Primary Examiner* — Aaron Dunwoody
(74) *Attorney, Agent, or Firm* — Vichit Chea; Bejin Bieneman PLC

(57) ABSTRACT

A duct for a heating/ventilation/air conditioning system of a vehicle includes a first end and a second end spaced a distance from the first end. An orifice extends between the first end and the second end. A semi-circular surface is disposed at the second end. The semi-circular surface extends about a radius having the same length as the distance between the first and second ends.

18 Claims, 6 Drawing Sheets

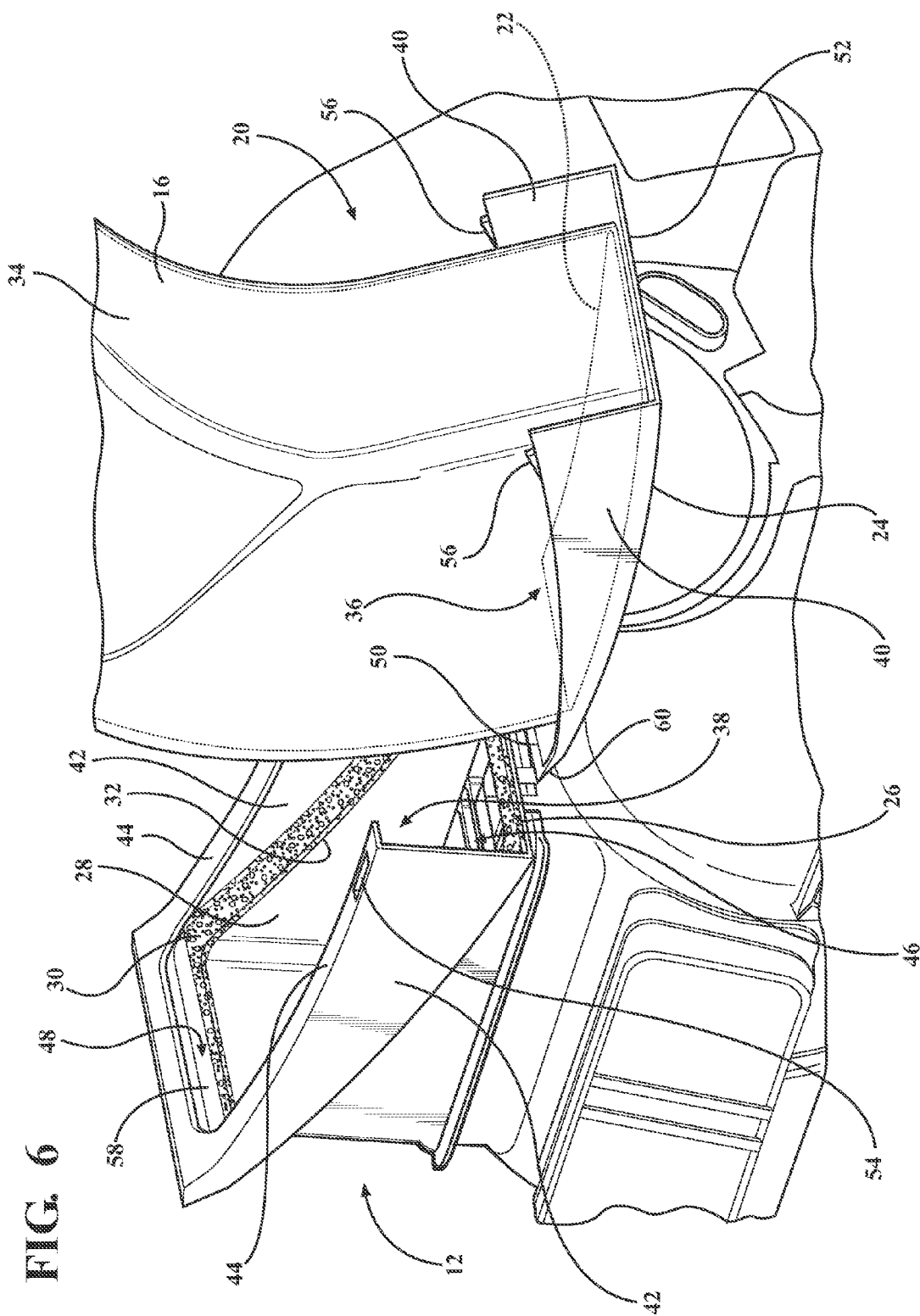

SWING ARC HVAC DUCT

BACKGROUND

A heating/ventilation/air conditioning (HVAC) system includes a duct assembly for transferring conditioned air to various locations. For example, an HVAC of a vehicle includes a duct assembly for transferring conditioned air into various locations of the vehicle cabin. The duct assembly may include ducts that extend from the engine compartment into the interior of the vehicle through an instrument panel, floor, etc., of the vehicle and/or may include ducts that extend from a rear auxiliary HVAC module. Stationary ducts, e.g., headliner ducts, may also extend through a headliner of the vehicle to deliver conditioned air to vents in the headliner. Connecting ducts may connect ducts in lower areas of the vehicles, e.g., the instrument panel, rear auxiliary HVAC module, etc., to the ducts in the headliner to transfer the conditioned air to the ducts in the headliner. The connecting ducts may be, for example, pillar ducts, i.e., ducts within the pillars of the vehicle such as the A-pillar, B-pillar, C-pillar, and D-pillar The pillar ducts are assembled at a later stage in the assembly process after the interior components that house ducts in the lower areas have been installed into the vehicle, and after the headliner has been installed into the vehicle. Since the interior components and the headliner are already installed in the vehicle, these interior components and headliner create packaging constraints that limit the direction in which the pillar ducts may be moved within the vehicle during the assembly process.

Specifically, the packaging constraints may prevent the pillar ducts from being connected to the headliner in a direct vertical direction or from a direct side-loading direction. As a result, the pillar ducts may be required to be moved in various directions during assembly. This increases the complexity of the assembly process by requiring fine manipulation of components to make the connection and raises the likelihood of damaging the headliner duct and/or the pillar duct. In addition, foam may be used to seal around the pillar duct and movement of the pillar duct in various directions during assembly may inadvertently damage the foam by wrinkling or tearing the foam, or displacing adhesive that holds the foam in place.

Accordingly, there remains an opportunity to design a connecting duct that is easily assembled without damaging the stationary duct or the connecting duct while providing flexibility needed to make the duct connection in a manner not requiring fine manipulations of parts to fit together.

BRIEF DESCRIPTION OF THE DRAWINGS

FIG. 6 is a perspective view of the second end of the connecting duct being engaged with the joint with a seal mounted to the joint.

DETAILED DESCRIPTION

With reference to the Figures, wherein like numerals indicate like parts throughout the several views, a duct assembly 10 for a heating/ventilation/air conditioning (HVAC) system is generally shown. The HVAC system may be the HVAC system of a vehicle (not shown). Alternatively, the HVAC system may be the HVAC system of a stationary structure such as a building.

Figure 1:
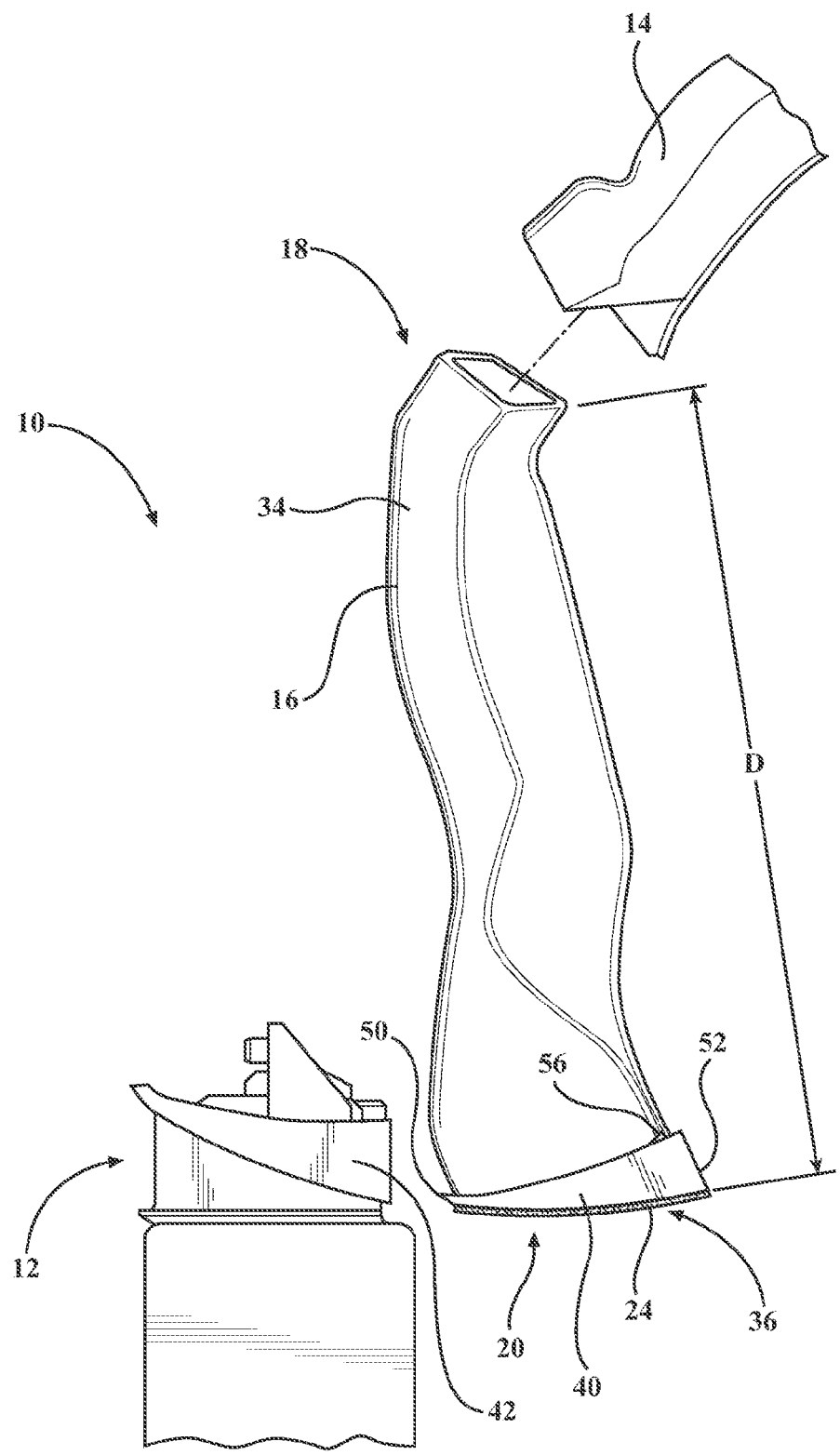
FIG. 1 is a perspective view of a connecting duct, a stationary duct, and a joint, before the connecting duct is assembled to the stationary duct and the joint.
Figure 2:
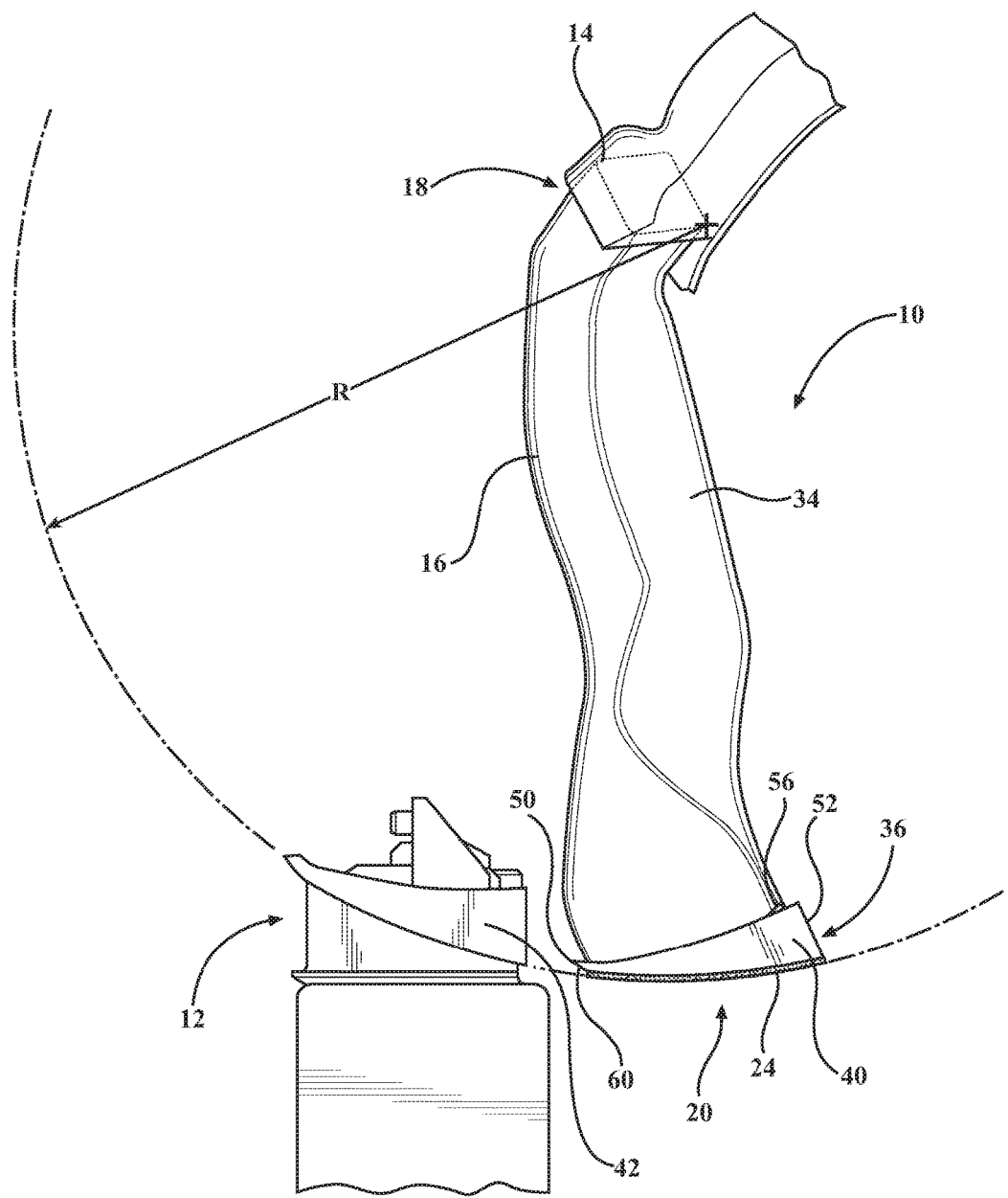
FIG. 2 is a perspective view of the connecting duct inserted into the stationary duct and being engaged with the joint.

The duct assembly 10 includes a joint 12 and a stationary duct 14. With reference to FIGS. 1 and 2, a connecting duct 16 extends between a first end 18 and a second end 20 spaced a distance D from the first end 18. For example, in the figures, the stationary duct 14 and the connecting duct 16 are for a vehicle. In particular, the stationary duct 14 is shown as a headliner duct, identified with reference numeral 14, and the connecting duct 16 is shown as a pillar duct, identified with reference numeral 16. The pillar duct 16 defines an orifice 22 extending between the first end 18 and the second end 20. With reference to FIG. 2, the first end 18 engages the headliner duct 14, and the second end 20 engages the joint 12. The pillar duct 16 includes a semi-circular surface 24 at the second end 20 extending about a radius R having the same length as the distance D between the first end 18 and the second end 20.

Figure 3:
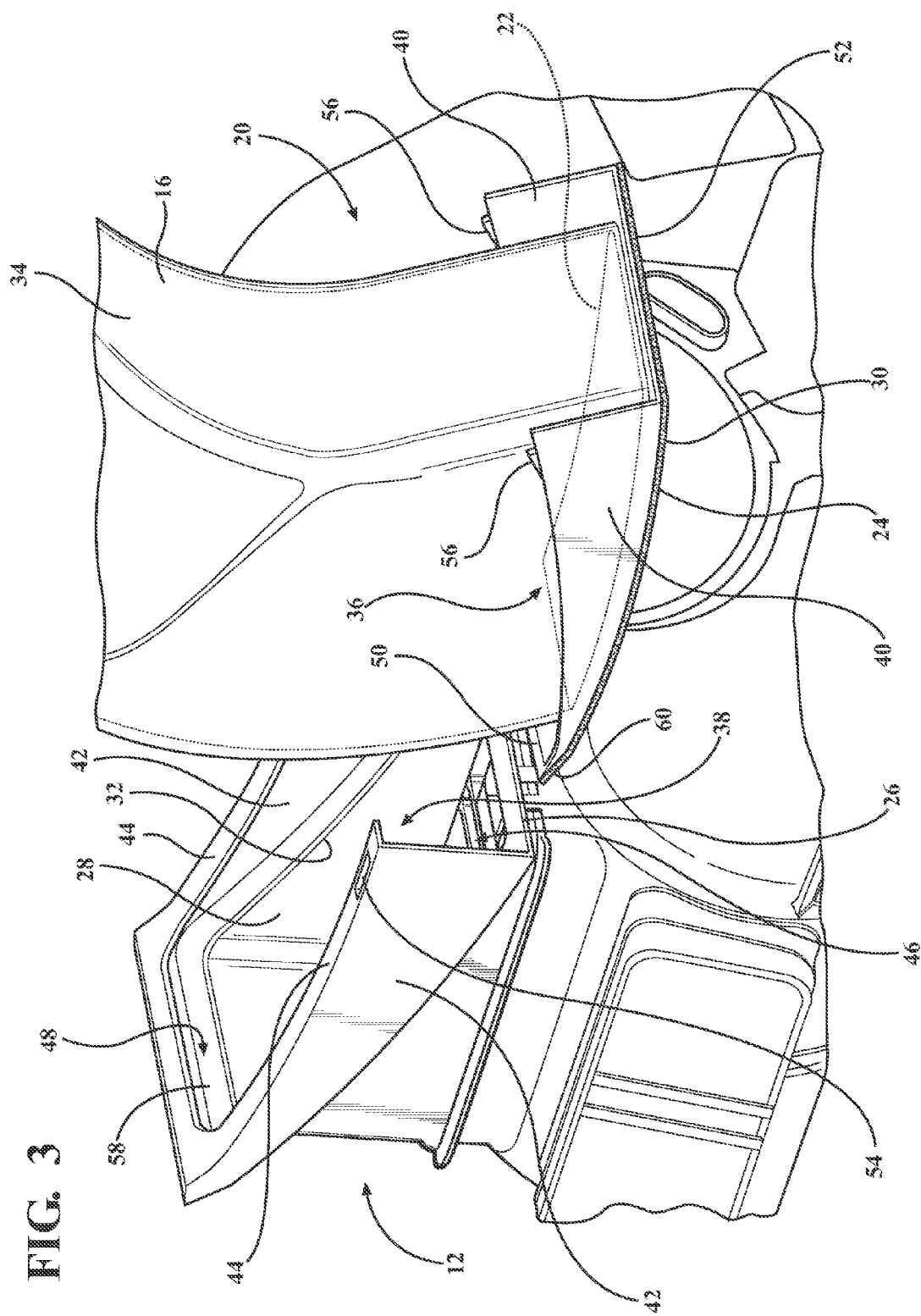
FIG. 3 is a perspective view of a second end of the connecting duct being engaged with the joint.
Figure 4:
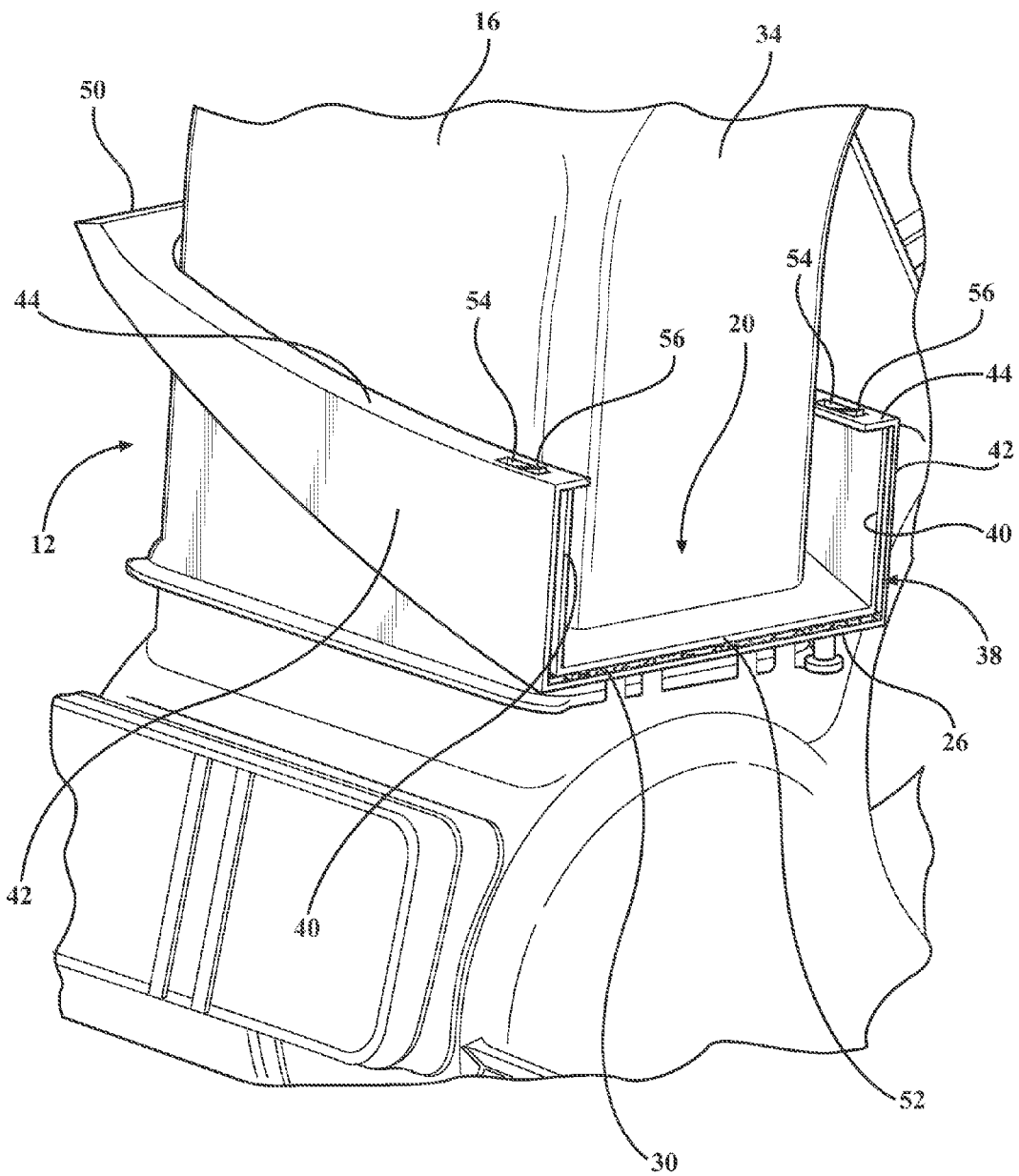
FIG. 4 is perspective view of the second end of the connecting duct engaged with the joint.

Since the radius R of the semi-circular surface 24 has the same length as the distance D between the first end 18 and the second end 20, the first end 18 may be inserted into the headliner duct 14, as shown in FIG. 2, and the pillar duct 16 may be rotated about the first end 18 to engage the second end 20 with the joint 12, as shown in FIGS. 3 and 4. In other words, the second end 20 may be swung into engagement with the joint 12. The radius R of the semi-circular surface 24 provides clearance between the semi-circular surface 24 and the joint 12 when the second end 20 is swung into engagement with the joint 12, and allows for gradual engagement between the second end 20 and the joint 12 as the second end 20 is swung into the joint 12, as set forth further below.

With reference to FIG. 3, the joint 12 includes a mating surface 26. The mating surface 26 receives the joint 12, as shown in the progressive movement in FIGS. 5A-C, and abuts the semi-circular surface 24 when the second end 20 engages the joint 12, as shown in FIG. 5C.

The mating surface 26 defines an orifice 28, as shown in FIG. 3. The orifice of the mating surface 26 is aligned with the orifice 22 of the pillar duct 16 when the second end 20 of the pillar duct 16 is engaged with the joint 12. Conditioned air from the HVAC system may be forced through the orifice 28 of the mating surface 26 and the orifice 28 of the pillar duct 16. Specifically, the conditioned air may be forced from the joint 12, through the pillar duct 16, and into the headliner duct 14.

The duct assembly 10 may include a seal 30 disposed on the second end 20 of the pillar duct 16 and/or seal 30 on the mating surface 26 of the joint 12. For example, the seal 30 is shown on the second end 20 in FIGS. 1-5C. In another configuration shown in FIG. 6, the seal 30 is shown on the mating surface 26 of the joint 12. The seal 30 may be of any suitable type. For example, the seal 30 may be foam, an elastomeric gasket, etc., attached to the second end 20 and/or the mating surface 26. In another configuration, the seal 30 may be formed of a material softer than the material of the second end 20 and/or mating surface 26 and may be integrally formed with the second end 20 and/or mating surface 26, e.g., by a two-shot molding process.

Figure 5A:
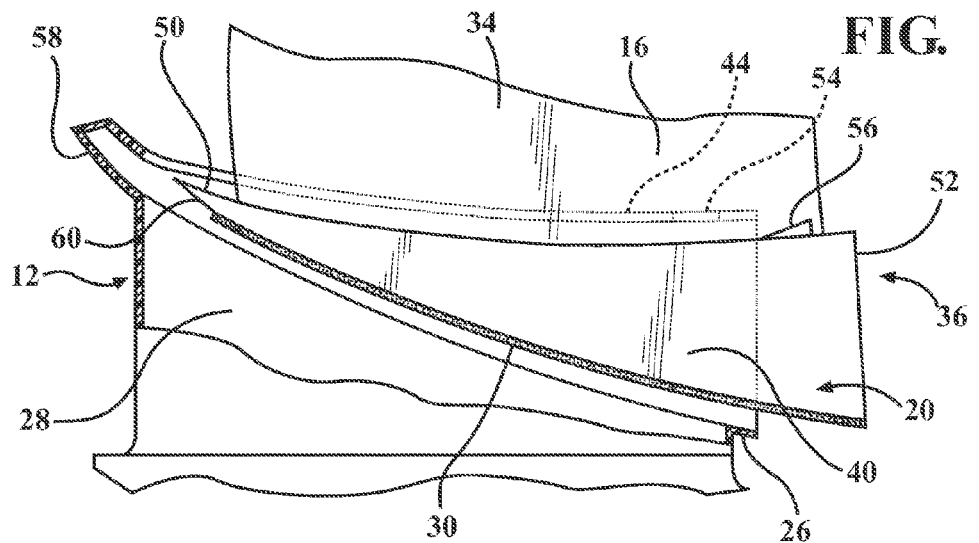
FIG. 5A is a cross-section of the joint showing the connecting duct being engaged with the joint.
Figure 5B:
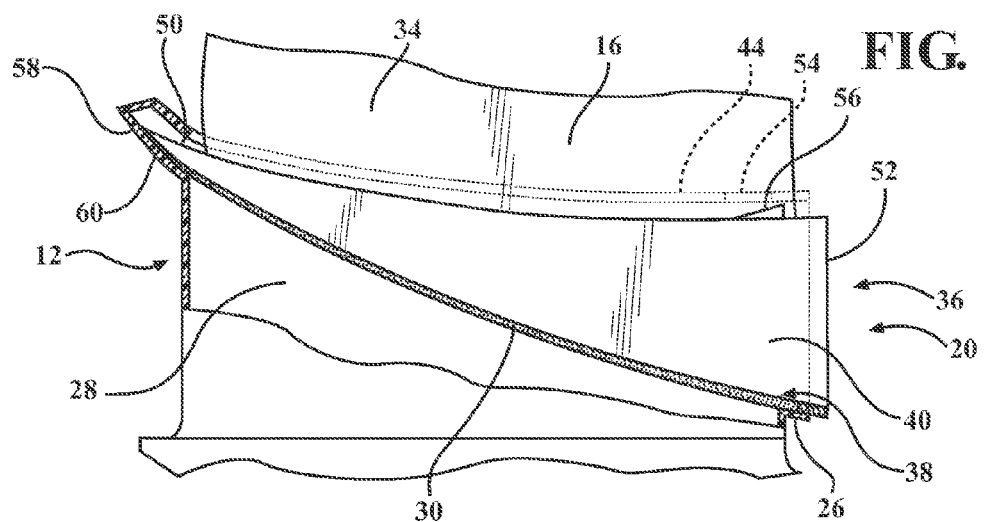
FIG. 5B is a cross-section of the joint showing a ramped surface of the second end of the connecting duct engaging a ramp of the joint for guiding the second end of the connecting duct into the joint.
Figure 5C:
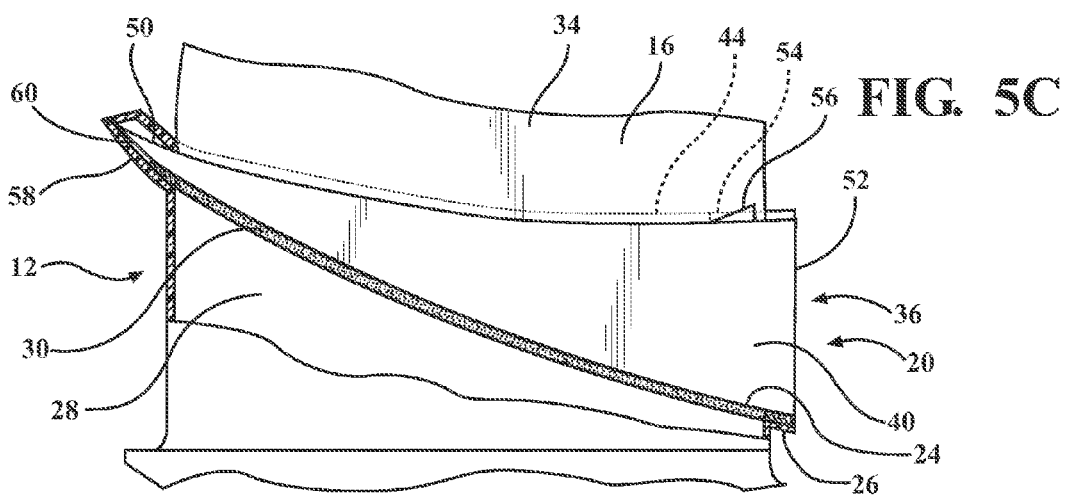
FIG. 5C is a cross-section of the joint with the second end engaged with the joint.

With reference to FIGS. 4 and 5C, when the second end 20 is engaged with the joint 12, the seal 30 seals between the semi-circular surface 24 and the mating surface 26. The seal 30 is resiliently compressible, and the semi-circular surface 24 and the mating surface 26 compress the seal 30 therebetween when the second end 20 is engaged with the joint 12.

The seal 30 may define an opening 32 aligned with the orifice 28 of the mating surface 26 and the orifice 22 of the pillar duct 16. In such a configuration, the seal 30 extends around a periphery of the orifice 26 of the mating surface and the orifice 22 of the pillar duct 16 to seal about the periphery.

The mating surface 26 may extend about the radius R. In other words, a curvature of the mating surface 26 may match a curvature of the second end 20 of the joint 12. As such, the likelihood of damaging the seal 30 when the second end 20 is engaged with the joint 12 is reduced. For example, in the configuration shown in FIGS. 1-5 with the seal 30 on the second end 20, as the second end 20 is inserted into the joint 12 during assembly, the seal 30 on second end 20 gradually approaches the mating surface 26 to gradually compress the seal 30 between the second end 20 and the mating surface 26. This gradual compression reduces the likelihood of damaging the seal 30, e.g., wrinkling the seal 30, unseating adhesive between the seal 30 and the second end 20, etc., during engagement of the second end 20 and the joint 12.

With reference to FIGS. 1 and 2, the pillar duct 16 includes a tube 34 presenting the first end 18 and a connecting head 36 presenting the second end 20. The connecting head 36 engages the joint 12. For example, as set forth further below, the connecting head 36 releasably engages joint 12.

With reference to FIG. 3, the joint 12 defines a track 38 that receives the second end 20 of the pillar duct 16, e.g., the connecting head 36. For example, the connecting head 36 of the pillar duct 16 include a flange 40 extending from the semi-circular surface 24 toward the first end 18 and the track 38 receives the flange 40, as shown in FIGS. 4-5C. The track 38 includes a wall 42 and a ledge 44 extending transversely the wall 42. In cross-section, the ledge 44 may extend in parallel to the mating surface 26 for trapping the flange 40 of the pillar duct 16 between the ledge 44 and the mating surface 26, as shown in FIGS. 4 and 5C. As shown in FIGS. 3 and 4, the pillar duct 16 may include two flanges 40 spaced from each other and the track 38 may include two walls 42/ledges 44 for receiving the flanges 40, respectively.

The track 38 may extend from an open end 46 to a closed end 48, as identified in FIG. 3, for example. As shown in FIGS. 3-5C, the track 38 receives the second end 20 of the pillar duct 16 in the open end 46, and the second end 20 is moved toward the closed end 48 to engage the second end 20 with the joint 12.

The flanges 40 of the second end 20 of the pillar duct 16 narrow from the open end 46 toward the closed end 48. In other words, the semi-circular surface 24 extends from a leading end 50 to a trailing end 52 and the flanges 40 widen in a direction along the semi-circular surface 24 from the leading end 50 to the trailing end 52.

As shown in FIG. 5C, the track 38 narrows from the open end 46 to the closed end 48. The shape of at least a portion of the track 38 may match the shape of at least a portion of the flanges 40.

One of the track 38 and the flange 40 defines a slot 54 and the other of the track 38 and the flange 40 presents a tab 56 engaged with the slot 54 when the second end 20 is engaged with the joint 12. For example, as shown in the Figures, the ledge 44 of the track 38 defines the slot 54. The tab 56 may be near the trailing end 52 of the flange 40 and the slot 54 may be near the open end 46 of the track 38. As such, as the second end 20 is seated in the joint 12, the tab 56 engages the slot 54 to lock the second end 20 to the joint 12.

As shown in FIGS. 5A-B, the tab 56 is sized to slide along the ledge 44 as the connecting head 36 is inserted into the joint 12 and, as shown in FIG. 5C, is sized to extend through the slot 54 when the second end 20 is seated in the joint 12.

The wall 42 and/or ledge 44 of the track 38 may be resiliently flexible so that the wall 42 and/or ledge 44 may be selectively flexed away from the tab 56 to disengage the slot 54 from the tab 56 to allow the second end 20 to be disengaged from the joint 12. The wall 42 and/or ledge 44 of the track 38 may be formed, for example, of plastic. The second end 20 and the joint 12 include two tabs 56 and corresponding slots 54, as shown in the figures. Alternatively, the second end 20 and the joint 12 may include any suitable number of tabs 56 and slots 54.

The track 38 defines a ramp 58 at the closed end 48 for guiding the second end 20 into the track 38 while minimizing the likelihood of damaging the seal 30, e.g., wrinkling the seal 30, unseating the adhesive of the seal 30, etc. The pillar duct 16 defines a ramped surface 60 extending from the semi-circular surface 24.

As shown in FIG. 5A, the ramped surface 60 is spaced from the seal 30 as the leading end 50 of the connecting head 36 is initially introduced into the open end 46 of the track 38 of the joint 12. As shown in FIGS. 5B and 5C, the ramped surface 60 abuts the ramp 58 as the second end 20 is further inserted into the joint 12. The second end 20 and the mating surface 26 may be configured to position the mating surface 26 spaced from the seal 30 until the ramped surface 60 abuts the ramp 58 to reduce the likelihood of damaging the seal 30 during insertion of the second end 20 into the joint 12.

As shown in FIGS. 5B and 5C, when the ramped surface 60 abuts the ramp 58, the ramp 58 forces the second end 20 to rotate, e.g., clockwise in FIGS. 5B and 5C, to clamp the second end 20 against the seal 30 and the mating surface 26. In other words, the ramped surface 60 remains spaced from the seal 30 during much of the insertion of the second end 20 into the track 38 and, when the ramped surface 60 contacts the seal 30, the ramp 58 guides the ramped surface 60 to clamp the seal 30 between the second end 20 and the mating surface 26 with minimal lateral movement of the ramped surface 60 relative to the seal 30. This clamping motion with minimal lateral movement reduces the likelihood of damaging the seal 30 during insertion of the second end 20 into the joint 12.

As shown in FIG. 5C, the ramped surface 60 abuts the ramp 58 of the track 38 when the second end 20 of the pillar duct 16 is engaged with the joint 12. The engagement of the ramped surface 60 and the ramp 58 when the second end 20 is seated in the track 38, as shown in FIG. 5C, pinches the seal 30 between the second end 20 and the mating surface 26.

As best shown in FIGS. 5A-C, the ramped surface 60 of the second end 20 extends from the leading end 50 in a direction away from the leading end 50. The ramped surface 60 extends transversely from the semi-circular surface 24 in a direction away from the leading end 50. Specifically, the ramped surface 60 extends at an obtuse angle relative to the trailing end 52.

To disengage the second end 20 from the joint 12, the connecting duct 16 may be pushed toward the joint 12 to compress the seal 30 and disengage the tab 56 from the slot 54. Once the tab 56 is disengaged from the slot 54, the second end 20 may be swung out of the joint 12. In addition or in the alternative, as set forth above, the wall 42 and/or ledge 44 of the track 38 may be resiliently flexible so that the wall 42 and/or ledge 44 may be selectively flexed away from the tab 56 to disengage the slot 54 from the tab 56 to allow the second end 20 to be disengaged from the joint 12.

The HVAC system may, for example, include a rear auxiliary HVAC module, which may be located in a rear of the vehicle. In such a configuration, the joint 12 and the headliner duct 14 may extend be located in a rear of the vehicle adjacent the D-pillar of the vehicle, and the pillar duct 16 may extend from the joint 12 to the headline duct along the D-pillar. The joint 12 may be, for example, an extension of the rear auxiliary HVAC module. The joint 12, rear headliner duct 14, and pillar duct 16 may, alternatively, be disposed at any pillar of the vehicle.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A duct assembly for a vehicle heating/ventilation/air conditioning system, the duct assembly comprising:
   a joint;
   a stationary duct; and
   a connector duct extending between a first end engaging the stationary duct and a second end spaced a distance from the first end and engaging the joint;
   the connector duct including a semi-circular surface at the second end extending about a radius having the same length as the distance between the first and second ends, the semi-circular surface having a leading end and a trailing end and terminating at the leading end and the trailing end;
   the connector duct including a flange extending transverse to the semi-circular surface from the semi-circular surface toward the first end, the flange extending along the semi-circular surface from the leading end to the trailing end of the semi-circular surface, wherein the flange widens from the leading end to the trailing end of the semi-circular surface.

2. The duct assembly as set forth in claim 1 wherein the joint includes a mating surface abutting the semi-circular surface and extending about the radius.

3. The duct assembly as set forth in claim 2 further comprising foam disposed on the mating surface.

4. The duct assembly as set forth in claim 1 wherein the joint defines a track receiving the flange.

5. The duct assembly as set forth in claim 4 wherein one of the track and the flange defines a slot and the other of the track and the flange presents a tab engaged with the slot.

6. The duct assembly as set forth in claim 4 wherein the track extends from an open end to a closed end and wherein the track narrows from the open end toward the closed end.

7. The duct assembly as set forth in claim 4 wherein the track includes an open end and a closed end and defines a ramp at the closed end.

8. The duct assembly as set forth in claim 7 wherein the connector duct defines a ramped surface extending from the leading end of the semi-circular surface, the ramped surface abutting the ramp of the track.

9. The duct assembly as set forth in claim 4 wherein the track includes a wall extending from the closed end to the open end and abutting the flange of the connector duct, wherein the wall narrows from the open end toward the closed end.

10. The duct assembly as set forth in claim 9 wherein the track includes a ledge extending transversely to the wall.

11. The duct assembly as set forth in claim 10 wherein the joint includes a mating surface abutting the semi-circular surface and extending about the radius, and wherein the ledge extends in parallel with the mating surface at the open end.

12. The duct assembly as set forth in claim 10 wherein the one of the ledge and the flange defines a slot and the other of the ledge and the flange presents a tab engaged with the slot.

13. A duct for a heating/ventilation/air conditioning system of a vehicle, the duct comprising:
   a first end and a second end spaced a distance from the first end with an orifice extending between the first end and the second end;
   a semi-circular surface at the second end;
   the semi-circular surface extending about a radius having the same length as the distance between the first and second ends; and
   a flange extending transverse to the semi-circular surface from the semi-circular surface toward the first end, the flange extending along the semi-circular surface from the leading end to the trailing end, wherein the flange widens from the leading end to the trailing end.

14. The duct as set forth in claim 13 further comprising a tube presenting the first end and a connecting head presenting the second end.

15. The duct as set forth in claim 14 wherein the connecting head includes a flange extending from the semi-circular surface toward the first end.

16. The duct as set forth in claim 15 further comprising a ramped surface extending from the leading end in a direction away from the leading end and the trailing end.

17. The duct as set forth in claim 16 wherein the ramped surface extends at an obtuse angle relative to the trailing end.

18. The duct as set forth in claim 13 further comprising a ramped surface extending transversely from the semi-circular surface in a direction away from the leading end.

* * * * *